Feb. 18, 1958  G. F. M. DAVIDSON ET AL  2,823,864
VENTILATION SYSTEMS FOR SHELTERS
Filed April 2, 1954
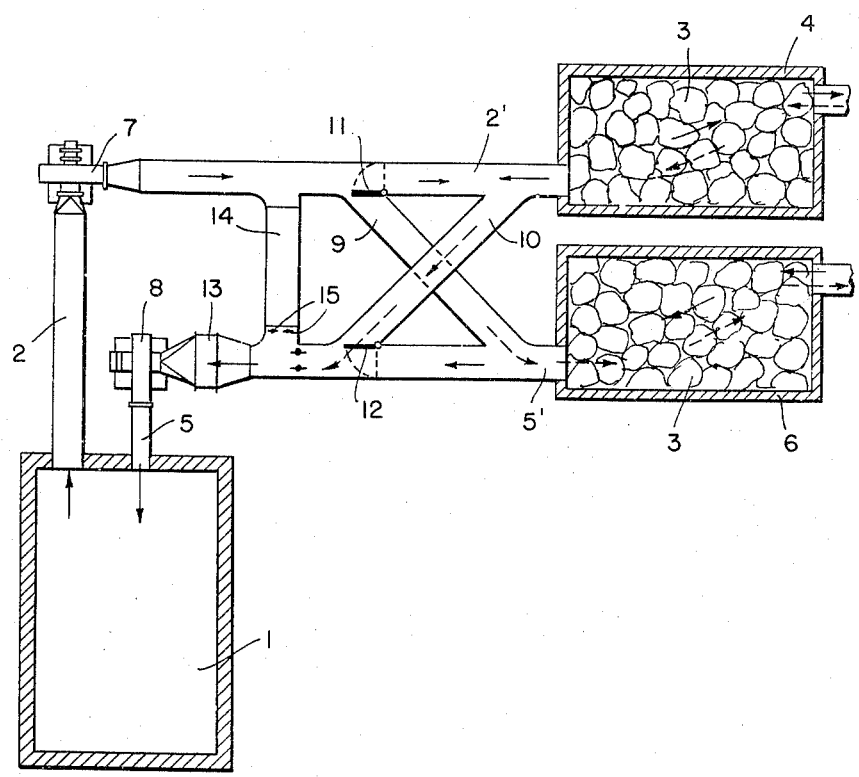
INVENTORS
GUSTAF FILIP MATTIAS DAVIDSON
GÖSTA ERIK LARSSON
BY
ATTORNEY

United States Patent Office 2,823,864
Patented Feb. 18, 1958

2,823,864
VENTILATION SYSTEMS FOR SHELTERS

Gustaf Filip Mattias Davidson, Bofors, and Gosta Erik Larsson, Hagersten, Sweden, assignors to Aktiebolaget Bahco, Stockholm, Sweden Application April 2, 1954, Serial No. 420,674

Claims priority, application Sweden April 9, 1953

2 Claims. (Cl. 237—50)

The present invention relates to a ventilation system for shelters of the type comprising a fresh-air inlet conduit and an evacuation conduit, each conduit including protective means against blast or shock waves consisting of a chamber filled with stones or the like.

The object of this invention is to minimize in a ventilation system of the type referred to above the cost and size of the heating units for heating the ventilating air sucked into the shelter and at the same time to prevent condensation and the accompanying danger of ice-formation in the means for protecting against blast or shock waves.

In accordance with this invention, this object is achieved by an arrangement which includes valved conduits interconnecting the air inlet conduit and the evacuation conduit, so that the sucked in air and the evacuation air may be caused to flow alternatingly through one or the other of the protective means against blast or shock waves to effect heat exchange between the sucked in air and the evacuated air.

The attached drawing illustrates by way of example diagrammatically and partly in section a ventilation system for a shelter in accordance with this invention.

Referring to the drawing, 1 denotes the shelter to be ventilated. The chamber 1 communicates through air conduits 2, 2' with a chamber 4 filled with stones 3 to absorb shock or blast waves and through fresh-air inlet conduits 5 and 5' with a similar chamber 6 also filled with stones 3 to absorb shock or blast waves. The conduits 2, 2' and 5, 5' are joined by a fan 7 and 8 respectively to suck air into the shelter 1 and to blow out the air therefrom respectively. The conduits 2' and 5' are in accordance with the invention connected to each other by two crossing conduits 9 and 10 so that the air flowing through conduit 2' depending on the position of the flap-valves 11 and 12, may be caused to flow out either through the chamber 4 or the chamber 6, while the fresh air flows through the chamber 6 or the chamber 4 respectively. In the embodiment shown on the drawing, there is also a damper-controlled connection conduit 14 between the two conduits 2' and 5'.

If for example, when the system is started the flap-valves 11 and 12 are set in the positions shown in full lines, the cold fresh-air will flow in through the chamber 6 and the conduits 5 and 5' to the shelter 1, the air being heated in the heating unit 13, while the hot evacuation air flows out to the atmosphere through the conduits 2 and 2' and the chamber 4. The evacuation air will give off part of its heat to the stones in the chamber 4. After the system has been operated in this manner for a certain period of time, the flap-valves 11 and 12 are placed in the position shown by broken lines, whereby the fresh air will flow through the chamber 4, conduit 2', conduit 10 and conduits 5' and 5 to the shelter, while the spent air is discharged through conduits 2, and 2' conduit 9, conduit 5' and the chamber 6. Thereby, the cold fresh air will be somewhat preheated in the chamber 4, so that the amount of heat supplied by the heating unit may be reduced. At the same time the stones in the chamber 6 will be heated by the warm evacuated air. After a suitable period the flap-valves 11 and 12 will be re-set etc.

If desired, part of the blown-out warm air may be caused to flow back directly to the inlet conduit 5 by a suitable setting of valves 15 provided in the by-pass conduit.

The invention is of course not limited to the embodiment shown and described, but many variations and modifications are possible without departing from the spirit and scope of the invention.

Having now particularly described the nature of our invention and the manner of its operation what we claim is:

1. A shelter installation comprising, in combination, a shelter housing, a permanent air inlet duct and a permanent air outlet duct operably associated with said housing, first and second shock absorbing chambers each being filled with solid agglomerate material to absorb shock waves and each constituting a regenerative heat exchanger, a first conduit communicating directly with said inlet duct and the first one of said chambers, a second conduit communicating directly with said outlet duct and the second one of said chambers, first and second bypass conduits extending between said first conduit and said second conduit, each of said bypass conduits having valve means adjacent to a different one of said first and second conduits for selectively controlling the passage of air between said first and second conduits, said valve means being selectively movable between a valve opening and a valve closing position to control the passage of air from either of said chambers to said inlet duct and from said outlet duct to either of said chambers, said valves in said closed position being operative to direct air from said first chamber to said inlet duct and from said outlet duct to said second chamber, and said valves in the open position being operative to direct air from said second chamber to said inlet duct and from said outlet duct to said first chamber.

2. A shelter according to claim 1 and further comprising heating means interposed between said inlet duct and said first conduit.

References Cited in the file of this patent
UNITED STATES PATENTS

| | | |
|---|---|---|
| 1,178,667 | Niewerth | Apr. 11, 1916 |
| 1,994,515 | Hausen et al. | Mar. 19, 1935 |
| 2,011,117 | Richter | Aug. 13, 1935 |
| 2,272,108 | Bradley | Feb. 3, 1942 |
| 2,732,027 | Wallin | Jan. 24, 1956 |